Feb. 20, 1962 H. REIFENHÄUSER 3,021,561
PLASTICIZING AND INJECTION APPARATUS FOR
PLASTIC OR SYNTHETIC MATERIALS
Filed March 4, 1959 2 Sheets-Sheet 1

INVENTOR
HANS REIFENHÄUSER
BY Williams, Silberry & Golrick
attys.

Feb. 20, 1962 H. REIFENHÄUSER 3,021,561
PLASTICIZING AND INJECTION APPARATUS FOR
PLASTIC OR SYNTHETIC MATERIALS
Filed March 4, 1959 2 Sheets-Sheet 2
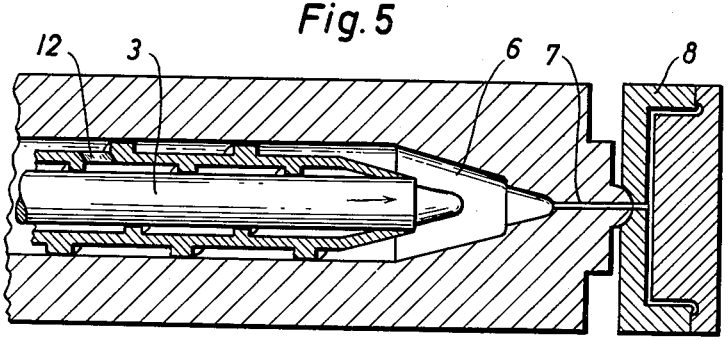
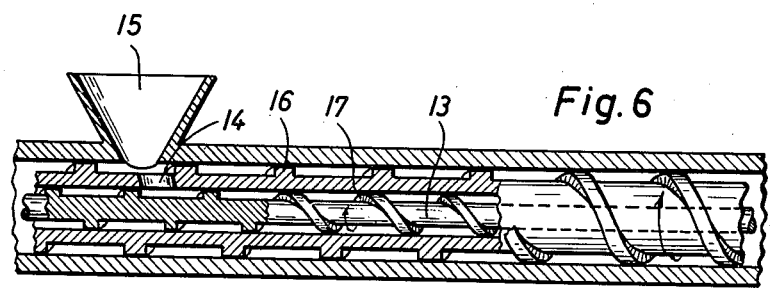
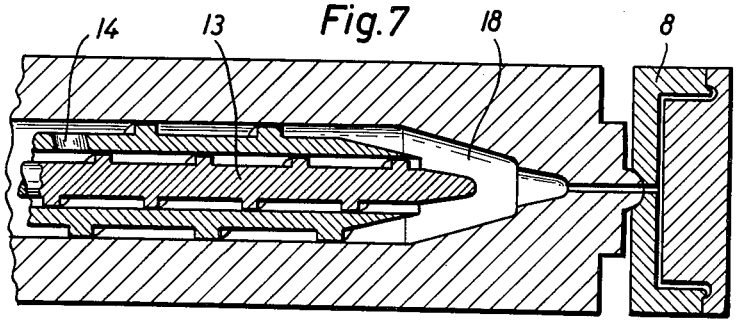
INVENTOR
HANS REIFENHÄUSER
BY Williams, Silberry & Golrick
attys.

United States Patent Office 3,021,561
Patented Feb. 20, 1962

3,021,561
PLASTICIZING AND INJECTION APPARATUS FOR PLASTIC OR SYNTHETIC MATERIALS
Hans Reifenhäuser, Troisdorf, near Koln, Germany, assignor to Reifenhauser K.G., Troisdorf, Germany
Filed Mar. 4, 1959, Ser. No. 797,162
2 Claims. (Cl. 18—30)

The present invention is concerned with a plasticizing and injection apparatus for processing of thermoplastic or synthetic plastic materials of all sorts by utilization of a screw type press.

Screw presses with a single screw or several, adjacent and interengaging screws are known to the art for the continuous ejection of plasticized masses. Further, there is known an arrangement in which two or more screws run coaxially one within another, wherein the individual screw members are provided with screw helices on the internal as well as on the external surfaces thereof. In all of these screw constructions, however, material introduced to the apparatus through a supply funnel or source and plasticized in the helices of the screw is continually advanced and ejected or extruded at a nozzle-like opening of the casing cylinder surrounding the screw. Consequently, the amount of the injection material immediately available is limited, so that a rather long time is required by such apparatus to fill an injection mold. Where the injection mold is filled too slowly with plastic, there can occur, however, a premature hardening of the plastic mass and consequently inhomogenities in the injected body. On the other hand, it has also been proposed, that plasticized injection material be gathered in a cylindrical storage space and suddenly expelled by a piston through the injection casting mouth piece to which the mold is applied. In such a case, the mold is indeed at times filled quickly enough, yet the material must be introduced into the injection casting cylinder in a plasticized state, and the entire apparatus as well as piston must be continually maintained at a constant temperature, whose range according to the type of plastic is very narrow.

The disadvantages of the known arrangements are obviated by the present invention by the combination of a screw press with a piston press. To this end, an axially reciprocable piston is disposed within a screw spindle of a screw press formed as a hollow cylinder; and the piston periodically expels material, continually supplied by the screw to a collection space in front of the injection nozzle, through the nozzle into an injection mold applied thereto. The size of the collection space provided between the injection nozzle and the end of the screw spindle is in this case so dimensioned that the molds for any sort of injection cast parts to be presented from time to time before the nozzle mouth piece, will be completely filled. Through the combination of a continually operating screw press with an intermittently operating piston press not only is the expulsion of the material accelerated, but also there is an essential improvement with respect to the problems of over-heating of the material and the retention time, so that decomposition cannot begin, and a very homogeneous mixture is available for the injection into the mold.

According to a further elaboration of the inventive thought, the screw spindle additionally carries threads on its inner side disposed toward the piston. These helices or screw threads have the function of keeping the piston constantly free of the mass, which under pressure arising upon expulsion and through the material advancing pressure of the screw, could perhaps penetrate the head end of the spindle.

If however, according to a further elaboration of the invention, there is provided, in the region of the press filling point, a connection between the spaces limited by the external and internal helices of the screw by means of a perforation or aperture of the hollow cylinder of the screw spindle, then also material is introduced into the inner helices between the inner screw and piston, so that the screw, both internally as well as externally plasticizes and advances the material. By this means there is attained an acceleration both of the plasticizing and of the advancement of the material, so that the storage or collection chamber is again quickly filled after every expulsion of material.

Instead of providing helices or screw threads on both sides of the cylindrical spindle body, or in other words on the inner and outer sides of the screw spindle, it is also in accord with the invention that the screw spindle, as usual, have external helices, while the inner hollow cylinder is smooth, in which case, however, the piston itself carries screw threads. In this case there is obtained the same result as by the arrangement of screws on both inside and outside of the screw spindle; in which case the piston likewise advances material toward the collection chamber. Where the piston is provided with screw threads, if it has also a rotation opposite that of the screw spindle, the total or overall conveying capacity is substantially increased for plastics adapted to such apparatus. For this purpose, the inner hollow or bore of the screw spindle again is connected by an aperture with the space between the outer threads of the spindle and the outer screw press casing. With this arrangement there is present the further advantage, that through the axial reciprocatory movement of the expulsion or injection piston, the material is freed from the cylinder walls and is further advanced towards the nozzle. Of course, by an inversion or reversal of the movements, the screw press casing can be arranged for axial displacement while the screw or the piston in the screw is held fixed. Examples of apparatus structures embodying the invention appear in the drawings, in which:

FIG. 5 is an enlarged representation of the screw injection head corresponding to FIG. 4; and, absent a screw spindle aperture to be described, of the head corresponding to FIG. 3;

FIG. 6 is a longitudinal, vertical section through a portion of a screw press cylinder in which the piston likewise is provided with the threads or helices; and FIG. 7 is an enlarged representation of injection head of a screw press cylinder corresponding to FIG. 6.

Figure 1:
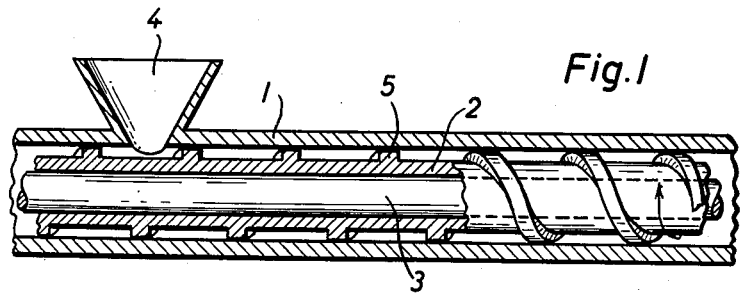
FIG. 1 is a vertical longitudinal section through a part of a screw press cylinder, in which the screw threads are provided on the exterior surface of the spindle.
Figure 2:
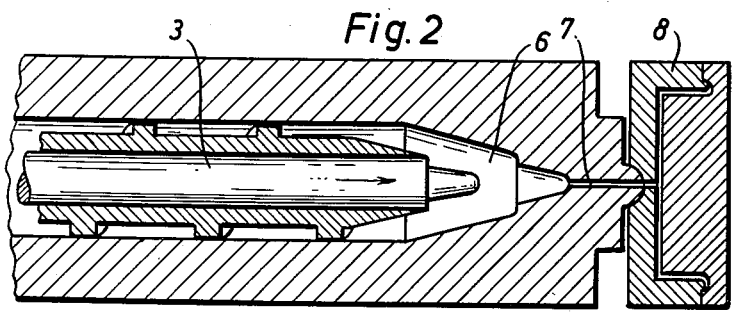
FIG. 2 is an enlarged cross-section through a press head corresponding to the arrangement of FIG. 1.

In the simplified drawings, there are shown the pertinent parts of the apparatus embodying the characteristic features of the present invention. Thus in fragmentary FIG. 1, to be taken in conjunction with the enlarged fragmentary FIG. 2, there is shown the casing or screw press cylinder 1, provided with the usual continuously rotated screw spindle 2 having an external screw thread or helical formations thereon for kneading or plasticizing plastic material introduced at the supply funnel 4 for processing, and slowly advancing the same toward the right to an injection head or nozzle communicating with removable injection mold 8 applied thereto. The screw spindle 2 here has a longitudinal axial bore in which is disposed, for a periodic relative reciprocatory movement, a piston 3, a so-called injection piston. At the injection head of the apparatus (see FIG. 2) the screw cylinder or casing 1 is provided with a space 6 between its inner wall and the end of the screw spindle 2, which, of course, has its maximum volume when piston 3 is in retracted position as shown. The space 6 serves as a gathering or supply space for material to be expelled or injected by extension of the piston into each injection mold 8 brought to and applied to the injection nozzle for each injection cycle. The injection head end of the cylinder as known to the art is of such form as to provide what might be termed a nipple cooperating with a complementary seat on the injection mold 8 applied or engaged therewith for a temporary sealed connection between the interior of the mold and channel 7. As may be noted in FIG. 2, the end of the piston 3 is preferably of a form complementary to the entrance region of the channel 7 for the more effective utilization of the collecting space 6, and of each injection stroke of the piston 3 in the direction indicated by the arrow in FIG. 2.

Between successive injection strokes, that is while the piston is retracted, the space 6 is filled by material brought forward by the screw, during which time a filled mold may be replaced by another.

Means for continuously rotating the screw spindle 2 in a sense advancing material from the funnel 4 toward the injection head or the supply space 6, and for periodically reciprocating the piston 3 are well known to the mechanical arts and to this particular art as well, and since per se forming no part of the present invention, such means are not shown. Thus a mold 8 may be applied to the injection head while the piston 3 is withdrawn into the position of FIG. 2, the gathering space being then filled with plastic material. Thereupon the piston 3 is extended toward the right, expelling material from the casing, more particularly from space 6, in other words injecting the material into the mold 8. After the mold 8 is filled, it is, of course, removed and replaced by another, either manually or more usually by mechanical placement means. Meanwhile the piston 3 having been withdrawn towards the left and the continuous rotary motion of the spindle 2 having advanced material into the space 6 to refill the same, another injection cycle begins.

Figure 3:
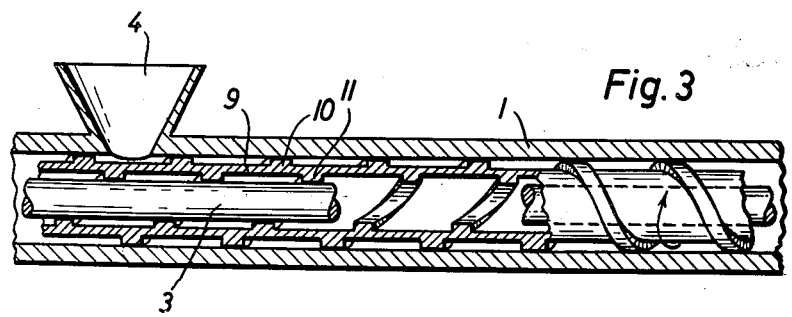
FIG. 3 is a vertical longitudinal section through a portion of a screw press cylinder in which the hollow screw spindle is provided with both external and internal screw helices.
Figure 4:
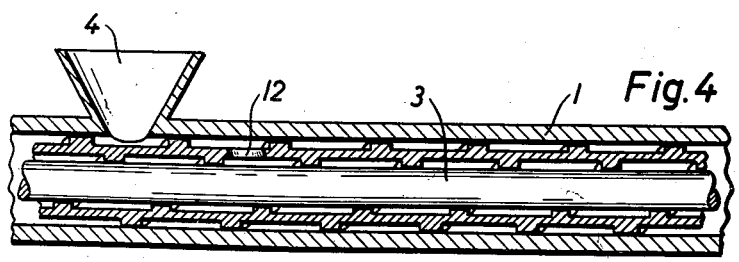
FIG. 4 is a longitudinal section through a screw press cylinder corresponding to FIG. 3, in which the exterior and interior plasticizing or kneading spaces between the helices are in communication with one another through an aperture of the spindle body.

In the modification of FIG. 3, the screw spindle 9 has not only an external screw thread or helix 10 but also the internal screw threads 11 in the bore thereof. In the modifications of FIGS. 4 and 5, in contrast with FIG. 3, the spaces bounded by these two screw threads or helices are in communication with one another through channel or aperture 12 in the screw spindle body.

Whereas in the aforedescribed modifications, the piston 3 appears as a smooth cylinder body or element, in the arrangement of FIGS. 6 and 7, the piston 13 is also provided with helices or threads. However, in both these modifications, the inner cylindrical space of the screw spindle is smooth. Also in this modification the spindle body is provided with apertures 14 whereby process material supplied by the supply funnel is enabled in part to reach the space between the external screw threads 16 on the spindle and in part as well between the external screw threads 17 of the piston, and be there plasticized. The injection head of this apparatus is formed, in manner similar to that of the apparatus of FIGS. 1 to 5, to provide a hollow or space 18 between the spindle head or the piston 13 and the injection nozzle 7, which serves as a collecting or supply space for the material and into which the screws continuously discharge while the piston 13 periodically forces the mass into the injection mold 8. As previously noted, with this form of the invention, the threaded piston advantageously is also rotatable for increasing the overall conveying capacity of the apparatus.

As previously stated, it is, of course, feasible to reciprocate this screw casing cylinder in the various modifications, the screw spindle or piston being held stationary.

For simplification of the drawings, and clarity of representation of the characteristic features of the invention, press cylinder heating elements, press framing, driving means, mold supports and other conventional elements or parts of the press or of the represented press components are omitted.

I claim:
1. A plasticizing and injection apparatus for processing of various types of plastic or synthetic materials, including a screw press, comprising: a casing cylinder, an injection nozzle on one end of the cylinder adapted for cooperative engagement with an injection mold, a screw spindle axially fixed in the cylinder having an external helix and continually rotatable for advancing material from a material supply opening toward the nozzle, a material collecting space being provided between the nozzle and adjacent end of the screw spindle, said spindle having an axial bore therethrough, and a piston having an external helix and disposed in said bore, said spindle having a radial opening located to provide at all times a passage between helical spaces formed internally and externally with respect to the spindle, said piston having rotary and axially reciprocating movements relative to the spindle for periodically expelling into a mold material continually supplied by the screw spindle and the external helix of said piston to said collecting space.

2. A plasticizing and injection apparatus for processing of various types of plastic or synthetic materials, including a screw press, comprising: a casing cylinder, an injection nozzle on one end of the cylinder adapted for cooperative engagement with an injection mold, a screw spindle member axially fixed in the cylinder having an external helix and continually rotatable for advancing material from a material supply opening toward the nozzle, a material collecting space being provided between the nozzle and adjacent end of the screw spindle member, said spindle member having an axial bore therethrough, and a piston member disposed in said bore, one of said members having a helix located interiorly of the spindle member, said spindle member having a radial opening located to provide at all times a passage between the helical spaces formed internally and externally with respect to the spindle member, said piston member having rotary and axially reciprocating movements relative to the spindle member for periodically expelling into a mold material continually supplied through said helical spaces to said collecting space.

References Cited in the file of this patent

UNITED STATES PATENTS

| 2,668,986 | Miler | Feb. 16, 1954 |
| 2,680,880 | Corbett | June 15, 1954 |
| 2,695,422 | Gray | Nov. 30, 1954 |
| 2,944,288 | Sherman | July 12, 1960 |

FOREIGN PATENTS

| 463,767 | Italy | May 31, 1951 |
| 902,287 | France | Nov. 27, 1944 |
| 1,070,500 | France | July 27, 1954 |
| 1,105,967 | France | Dec. 9, 1955 |